US012246951B1

(12) United States Patent
Burian

(10) Patent No.: US 12,246,951 B1
(45) Date of Patent: Mar. 11, 2025

(54) QUICK-ACTION SHACKLE

(71) Applicant: Paul Nicolae Burian, Coral Springs, FL (US)

(72) Inventor: Paul Nicolae Burian, Coral Springs, FL (US)

( * ) Notice: Subject to any disclaimer, the term of this patent is extended or adjusted under 35 U.S.C. 154(b) by 0 days.

(21) Appl. No.: 18/752,398

(22) Filed: Jun. 24, 2024

(51) Int. Cl.
*B66C 1/66* (2006.01)
*B66C 1/38* (2006.01)

(52) U.S. Cl.
CPC .................................... *B66C 1/66* (2013.01)

(58) Field of Classification Search
CPC .............. B66C 1/66; B66C 1/36; F16G 15/06
USPC ...................................................... 294/82.23
See application file for complete search history.

(56) References Cited

U.S. PATENT DOCUMENTS 2,124,912 A * 7/1938 Ehmann .................. F16G 15/06 411/956
4,068,960 A * 1/1978 Swager ................... F16G 15/06 403/324
4,102,124 A * 7/1978 Swager ................... F16G 15/06 403/9
4,145,874 A * 3/1979 Muller .................... F16G 15/06 59/93
5,046,881 A * 9/1991 Swager ................. F16D 25/082 403/324
7,393,033 B1 * 7/2008 Bisso, IV ................ F16G 15/06 294/82.35
7,448,823 B2 * 11/2008 Silva ....................... F16G 15/06 403/325
7,540,140 B1 * 6/2009 Diaz ....................... F16G 15/06 70/52
8,677,727 B2 * 3/2014 Robins .................... F16G 15/06 403/325
10,781,886 B2 * 9/2020 Betzler ................... F16G 15/06
10,895,304 B2 * 1/2021 Betzler ................... F16G 15/06
2023/0130421 A1 * 4/2023 Bjørgum ................. F16G 15/06 59/86
2023/0130912 A1 * 4/2023 Gahr ....................... F16B 39/10 411/366.1

* cited by examiner

*Primary Examiner* — Paul T Chin
(74) *Attorney, Agent, or Firm* — Cynthia S. Lamon; Lamon Patent Services

(57) ABSTRACT

A shackle apparatus has a bow having first and second legs, with first and second aligned holes through the legs, a capture head affixed to the bow outside of the second leg, aligned with the second hole, the capture head comprising metal balls in radial channels, and an anchor pin adapted to fit through the first and second holes and into the capture head, the anchor pin having a circumferential groove proximate an end entering the capture head. Placing the anchor pin through the first and second holes and into the capture head causes the capture head to move the balls radially into the circumferential groove in the anchor pin, locking the anchor pin in the bow.

18 Claims, 9 Drawing Sheets

QUICK-ACTION SHACKLE

BACKGROUND OF THE INVENTION

1. Field of the Invention

The present invention is in the technical field of apparatus for joining a lifting device to a load and pertains more particularly to an element for facilitating joining of a chain or a cable webbing sling, round sling and different lifting equipment from a lifting device to a load to be lifted.

2. Description of Related Art

A shackle, also sometimes known as a gyve, is, in the conventional art, a U-shaped or Omega shaped metal element secured with a clevis pin or bolt across an opening of the U-shaped element. Various sorts of quick release locking pins are known in the art used with shackles Security and quick application and release are desirable attributes with a shackle, and present various degrees of difficulty with shackles in the current art. What is clearly needed is a shackle that is very secure when locked, quick to release with one hand by a user, and also quick to apply and lock.

BRIEF SUMMARY OF THE INVENTION

A shackle apparatus is provided, comprising a bow having first and second legs, with first and second aligned holes through the legs. A capture head may be affixed to the bow outside of the second leg, aligned with the second hole, the capture head comprising metal balls in radial channels. An anchor pin is adapted to fit through the first and second holes and into the capture head, the anchor pin having a circumferential groove proximate an end entering the capture head. In this embodiment, the anchor pin is placed through the first and second holes and into the capture head causes the capture head to move the balls radially into the circumferential groove in the anchor pin, locking the anchor pin in the bow.

In one embodiment the capture head comprises a body with a substantially hollow cylindrical cross-section, the body closed on a first end and open with male threads on a second end and a plurality of three or more channels extending radially and equally spaced, at a point along a length of the body, the body joined rigidly to the bow with the male threads engaging female threads in the inside diameter of the second hole through the second leg. In this embodiment, the body is rigidly joined to the bow by male threads on an end of the body toward the bow engaging female threads in one of the holes through the legs of the bow. The capture head further comprises a plunger within the body having an outside diameter as a slip fit with an inside diameter of the body and a first compression spring between the closed end of the body and the plunger, biasing the plunger toward the bow.

In another embodiment the capture head further comprises a locking sleeve with an inside diameter engaging an outside diameter of the body and a conical shape on one end, the sleeve capturing the locking pin in an L-shaped notch having a first longitudinal leg and a second leg at a right angle to the longitudinal leg, the first longitudinal leg constraining the sleeve to translate a limited length in a direction of an axis of the body and the second leg constraining the sleeve to rotate a limited amount about the body, the sleeve urged toward the bow by a second compression spring between a first shoulder on the sleeve and a second shoulder on the body. In this embodiment, a first retainer loop on the bow on a side opposite the capture head is added, including a second retainer loop on an end of the anchor pin opposite the end inserted through the holes in the legs of the bow, with a tie between the retainer loops of a length that he anchor pin may be inserted through the holes in the legs of the bow and removed, the tie between the retainer loops ensuring that the anchor pin always stays with the bow.

Additionally, with the anchor pin removed from the holes in the legs of the bow, the balls are constrained to be wholly outside the outer diameter of the anchor pin by an outside diameter of the plunger with the balls constraining the sleeve away from the bow, and wherein placing the anchor pin through the holes in the legs of the bow and against the plunger, pushing the plunger against the first compression spring, the plunger moves toward the closed end of the body, the circumferential groove in the anchor pin aligns with the balls, and the sleeve, urged by the second compression spring, moves the balls into the groove and captures the balls in the groove, locking the anchor pin in the capture head. In this embodiment, a user rotating the sleeve holding the balls in the groove of the anchor pin may lock the sleeve in a forward position with the locking pin in the second leg of the L-shaped notch keeps the anchor pin locked in the bow. With the anchor pin locked into the capture head, a user rotating the sleeve to bring the locking pin aligned with the longitudinal leg of the L-shaped notch and pulling the sleeve toward the closed end of the body enables the plunger urged by the first compression spring to move the anchor pin in a direction away from the closed end of the body, an edge of the groove in the anchor pin moving the balls radially away out of the groove with an outside diameter of the plunger moving to hold the balls outside an outside diameter of the anchor pin. In this embodiment, the user is enabled to pull the unlocked anchor pin fully out through the holes in the legs of the bow.

A method for providing a shackle may also be provided including steps of placing an anchor pin having a circumferential groove proximate one end of the anchor pin through aligned holes in legs of a bow with the end having the circumferential groove entering a capture head rigidly affixed to the bow, the capture head having three or more balls in equally spaced radial channels; and moving the anchor pin to a position where the circumferential groove aligns with the radial channels of the capture head, at which position the balls enter the circumferential groove and the anchor pin is locked in the bow. In this embodiment, the capture head comprises a body with a substantially hollow cylindrical cross-section, the body closed on a first end and open with male threads on a second end and a plurality of three or more channels extending radially and equally spaced, at a point along a length of the body, the body joined rigidly to the bow with the male threads engaging female threads in the inside diameter of the second hole through the second leg, wherein the step of moving the anchor pin translates the anchor pin in the body and aligns the groove with the channels in the body.

Additional steps are provided including rigidly joining the body to the bow by engaging male threads on an end of the body toward the bow with female threads in one of the holes through the legs of the bow. The capture head may further comprise a plunger within the body having an outside diameter as a slip fit with an inside diameter of the body and a first compression spring between the closed end of the body and the plunger, biasing the plunger toward the bow, comprising moving the anchor pin against the plunger compressing the first compression spring. Additionally, the capture head further comprises a locking sleeve with an inside diameter engaging an outside diameter of the body and a conical shape on one end, the sleeve capturing the locking pin in an L-shaped notch having a first longitudinal leg and a second leg at a right angle to the longitudinal leg, the first longitudinal leg constraining the sleeve to translate a limited length in a direction of an axis of the body and the second leg constraining the sleeve to rotate a limited amount about the body, the sleeve urged toward the bow by a second compression spring between a first shoulder on the sleeve and a second shoulder on the body.

A further step may be included including, with the anchor pin removed from the holes in the legs of the bow, constraining the balls wholly outside the outer diameter of the anchor pin by an outside diameter of the plunger with the balls constraining the sleeve away from the bow, and placing the anchor pin through the holes in the legs of the bow and against the plunger, pushing the plunger against the first compression spring, the plunger moving toward the closed end of the body, the circumferential groove in the anchor pin aligning with the balls, and the sleeve, urged by the second compression spring, moving the balls into the groove and capturing the balls in the groove, locking the anchor pin in the capture head. In this embodiment, a user rotates the sleeve holding the balls in the groove of the anchor pin, locking the sleeve in a forward position with the locking pin in the second leg of the L-shaped notch keeping the anchor pin locked in the bow.

Additionally, with the anchor pin locked into the capture head, the sleeve is rotated to bring the locking pin aligned with the longitudinal leg of the L-shaped notch and pulling the sleeve toward the closed end of the body, enabling the plunger urged by the first compression spring to move the anchor pin in a direction away from the closed end of the body, an edge of the groove in the anchor pin moving the balls radially away out of the groove with an outside diameter of the plunger moving to hold the balls outside an outside diameter of the anchor pin. The user then pulls the unlocked anchor pin fully out through the holes in the legs of the bow.

DETAILED DESCRIPTION OF THE INVENTION

Figure 1A:
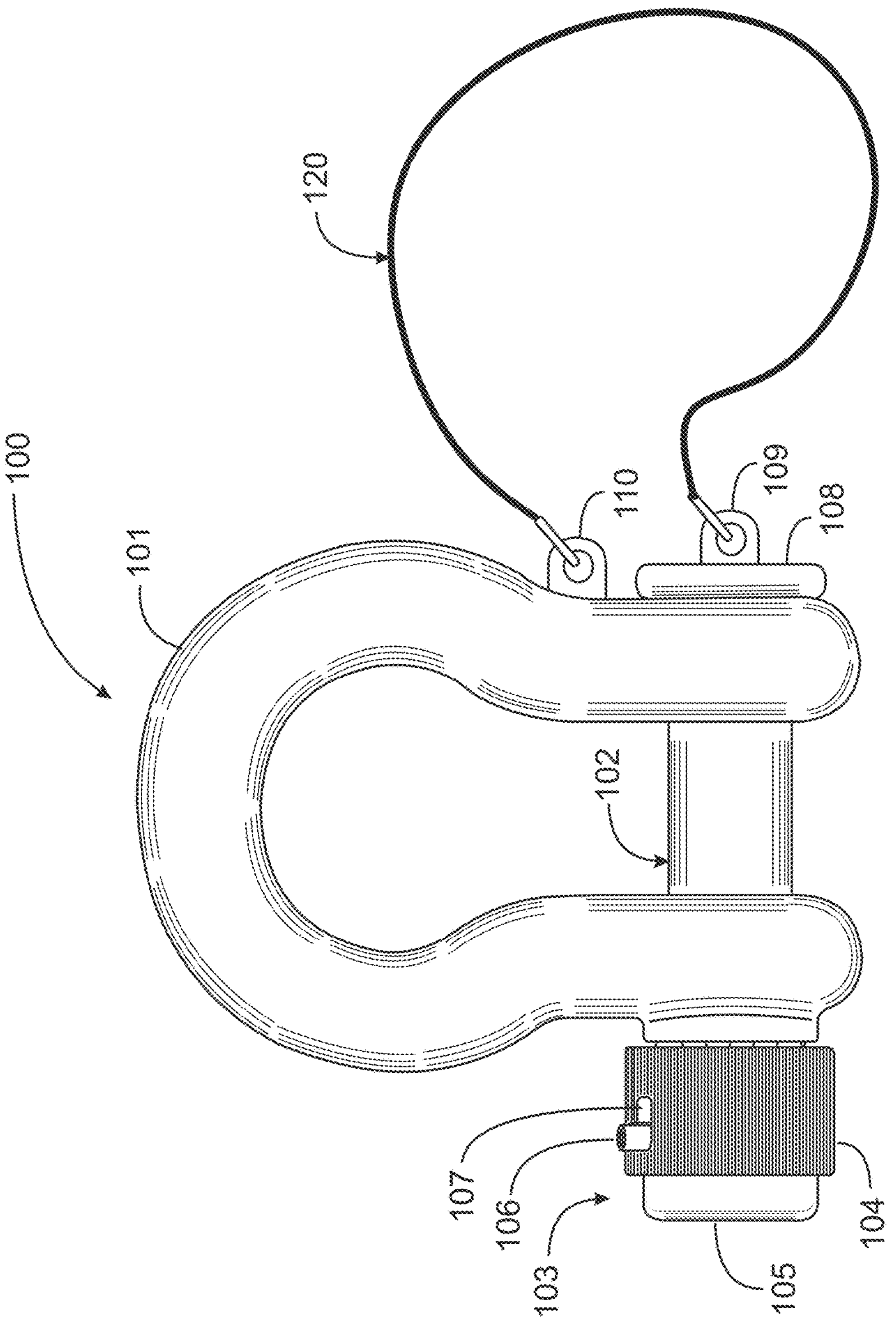
FIG. 1A is an assembly view of a quick-action shackle in one embodiment of the present invention.

FIG. 1A is an assembly view of a quick-action shackle 100 in an embodiment of the present invention. Shackle 100 has a U-shaped bow 101 with holes in ends of the bow aligned to receive an anchor pin 102 that may be inserted and removed from the bow. Anchor pin 102 has in this example a head end 108 with a shoulder to contact the end of the bow to position the anchor pin in the bow. Bow 101 has a first retainer loop 110 and pin 102 has a second retainer loop 109 on head end 108, with an attachment cable 120 connected between the two retainer loops to keep the anchor pin always attached whether inserted or removed from the bow. Anchor pin 102, when fully inserted through the bow as shown, with head end 108 in contact with the bow, is locked in place by a capture head 103 that has a body 105 firmly joined to bow 101 by male threads on one end of the body engaging female threads in a hole through one leg of bow 101. The threads are not indicated in FIG. 1. Body 105 is thus constrained to be rigid with respect to the bow. Body 105 has a male-threaded locking pin 106 with the threaded portion engaging female threads in a portion of body 105. Locking pin 106 engages an L-shaped notch 107 in a knurled sleeve 104.

Figure 1B:
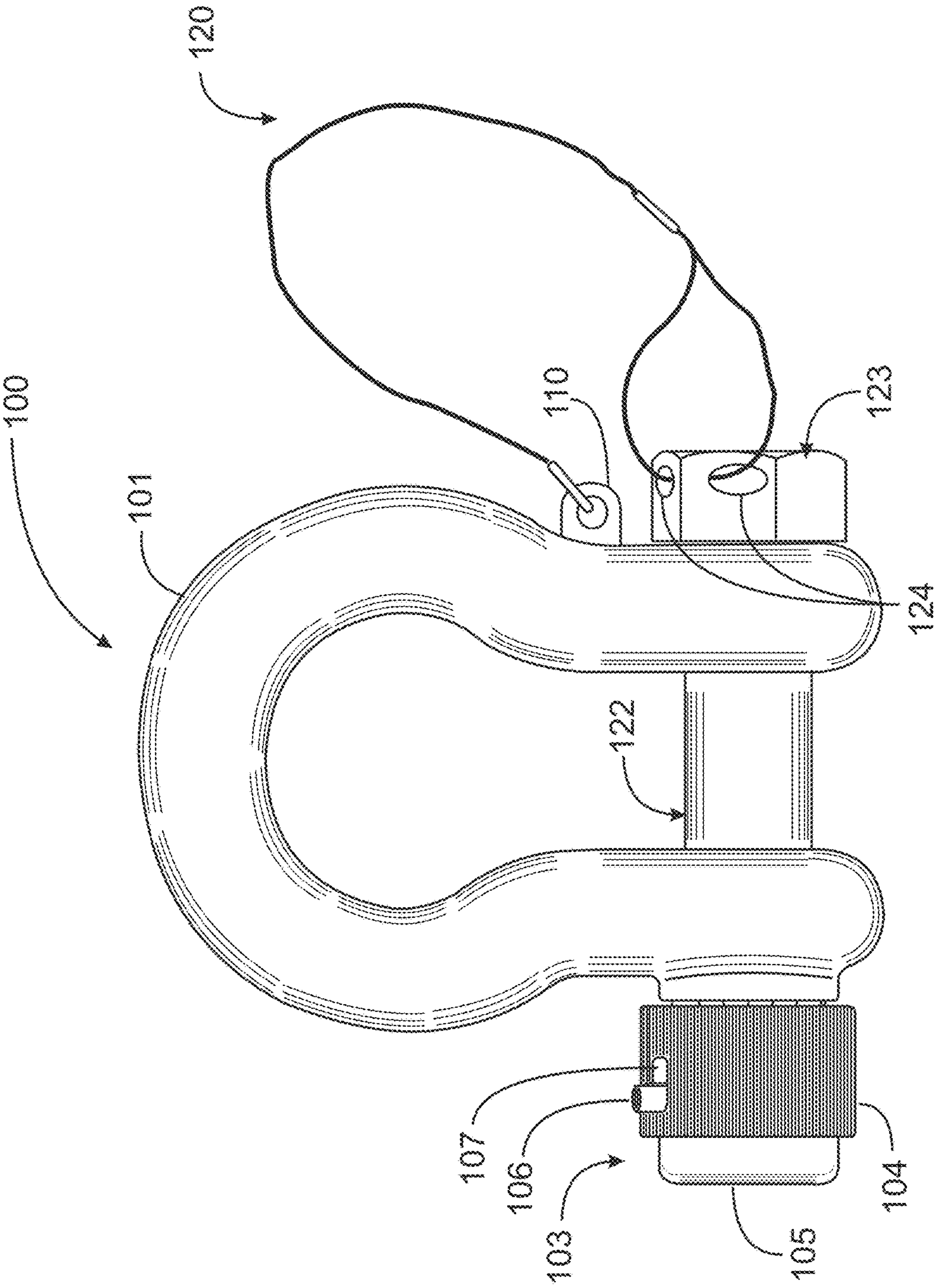
FIG. 1B is an assembly view of a quick-action shackle in an alternative embodiment of the invention.

FIG. 1B is a side elevation view of a shackle assembly in an alternative embodiment of the invention. A salient difference between the shackle assembly of FIG. 1A and that of FIG. 1B is that the assembly in FIG. 1B has a different anchor pin 122 than does the assembly of FIG. 1A, which uses anchor pin 102. Anchor pin 122 has a hexagonal head 123. Head 123 has a diagonal hole through two facets of the hexagon of the head as shown for receiving the cable 120 that keeps the anchor pin always with the bow. A purpose of the alternative hex head for the anchor pin is that the inventor feels that is offers a better grip for a user in taking the anchor pin out of the bow and reinserting and locking it through the bow.

Figure 3C:
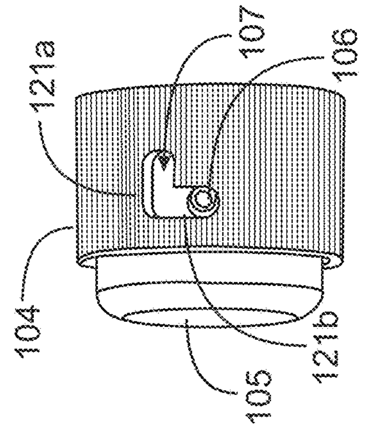
FIG. 3C is a top view of a locking sleeve in an embodiment of the invention.

Capture head 103 and its elements are the same for the embodiment of FIG. 1A as for the embodiment of FIG. 1B. L-shaped notch 107 is illustrated from a top view in FIG. 3C, showing a longitudinal leg 121*a* in a direction of an axis of the anchor pin, and a leg 121*b* that is in a direction of rotation of sleeve 104 about body 105. Sleeve 104 may be rotated around body 105 a small amount, limited by length of leg 121*b* of L-shaped slot 107, and sleeve 104 may be translated a small amount toward or away from the bow in a direction of the axis of the anchor pin, limited by length of a leg 121*a* of L-shaped notch 107. An important aspect of implementing the novel quick-action shackle 100 is the two-step security aspect wherein in a first step a user must twist capture head 103 and a second step requires the user to pull, thereby negating an accidental release of the anchor pin 122.

Figure 2:
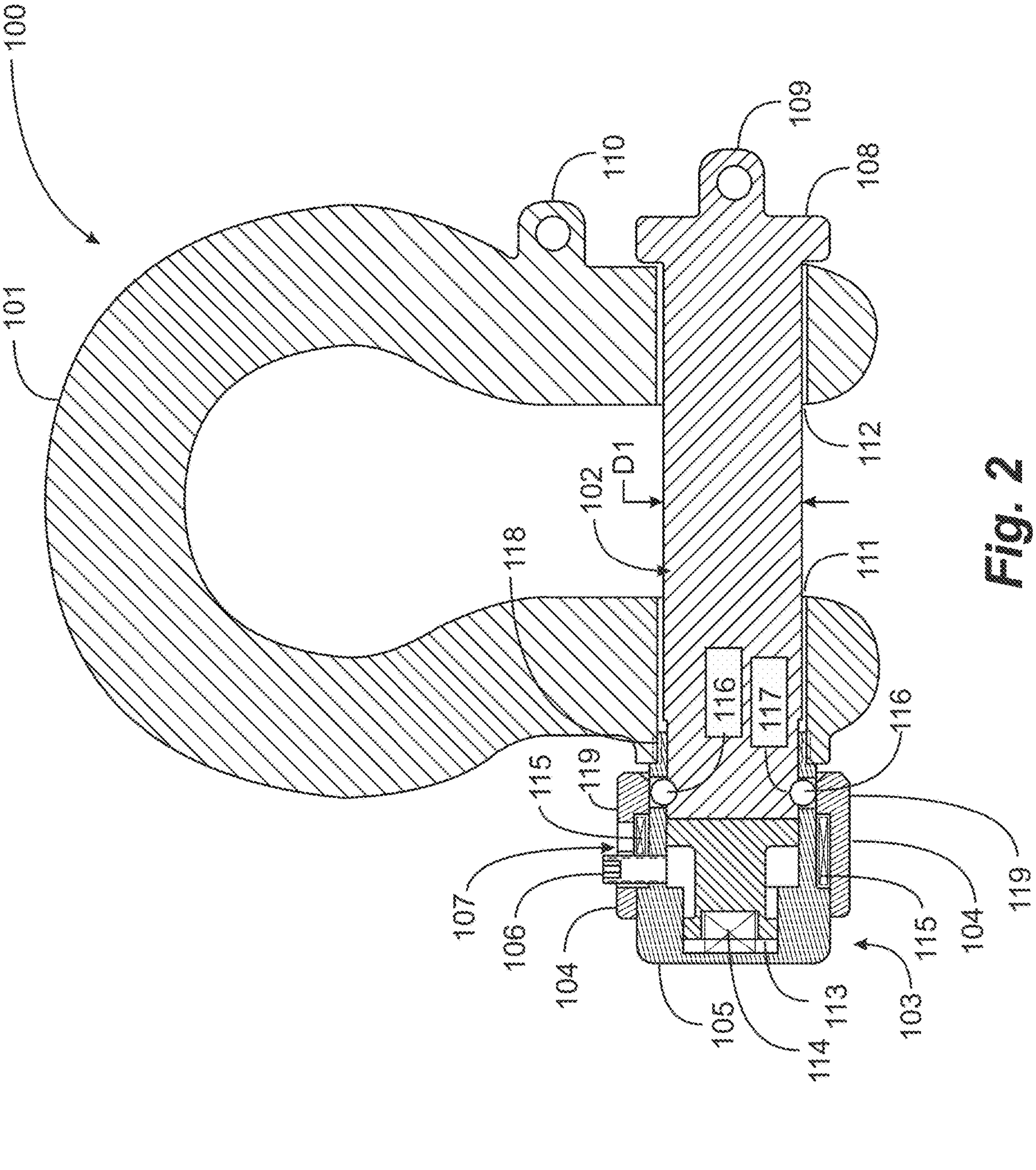
FIG. 2 is a section view of the assembly of FIG. 1A taken in the plane of the drawing along a centerline of a pin inserted in the bow of the shackle.

FIG. 2 is a section view of the assembly of FIG. 1A taken in the plane of the drawing along the axis of anchor pin 102 inserted in the bow of the shackle. It should be apparent to the skilled person that a section of FIG. 1B will be the same as that for FIG. 1A except for the portion through the head end of the anchor pin. Bow 101 is seen in full section with retainer loop 110, but without cable 120 of FIG. 1A. Bow 101 has holes 111 and 112 through lower ends of legs of the bow. Holes 111 and 112 are of a common inside diameter larger than an outside diameter of anchor pin 102 or 122, such that the anchor pin may be passed through holes 111 and 112. Hole 111 on the side toward capture assembly 103 has an internal female thread. Body 105 on the end facing the bow has male threads that engage the female threads in hole 111. The mated threads are indicated by element number 118 in FIG. 2.

The shackle assembly is shown in FIG. 2 with anchor pin 102 fully inserted and locked by capture assembly 103 across the legs of bow 101. A plurality of balls 116 are shown constrained in radial channels in a hollow cylindrical portion of body 105. Balls 116 are shown engaged in groove 117 and constrained to stay fully engaged by a forward portion 119 of sleeve 104 fully enclosing the plurality of balls and preventing disengagement from groove 117 of anchor pin 102. In different embodiments there must be at least three balls, but in some embodiments there are more than three. A compression spring 115 is imposed in a space between sleeve 104 and body 105 and serves to urge sleeve 104 toward bow 101. This spring tension must be overcome to draw sleeve 104 away from the locked position.

Figure 3A:
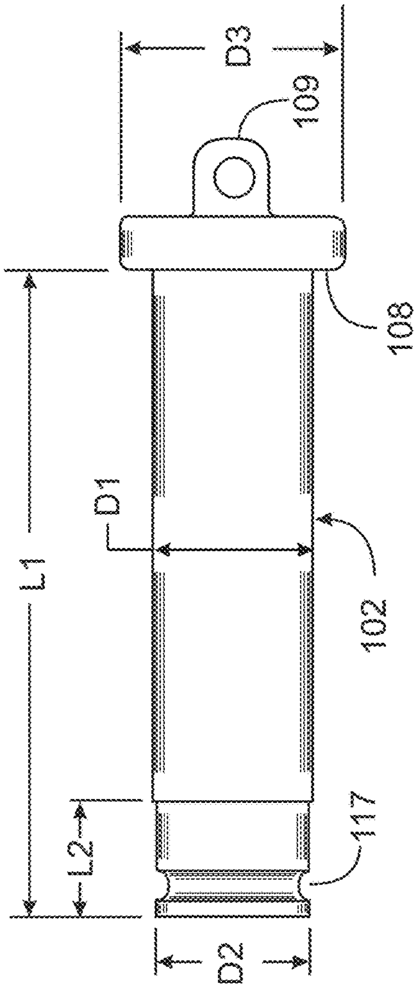
FIG. 3A is a side elevation view of an anchor pin in an embodiment of the invention.

Anchor pin 102 is illustrated in a side elevation view in FIG. 3A. Anchor pin 102 has an overall length L1 from inside head end 108 to an end that extends into capture head 103, as shown in FIG. 2. A portion of anchor pin 102 that extends through holes 111 and 112 in legs of bow 101 has a diameter D1 that is marginally smaller than the inside diameter of holes 111 and 112. A second portion of length L2 has a marginally lesser diameter D2. A circumferential groove 117 is provided proximate the end of the anchor pin that extends into capture head 103. Groove 117 has a partial-circular cross section and is somewhat less in depth than one-half the diameter of the balls 116. This depth is important to the operation of the capture head when locking and unlocking. The groove is provided to engage individual ones of a plurality of balls 116 that are constrained in capture bores in body 105 as may be seen in FIG. 2.

Figure 3B:
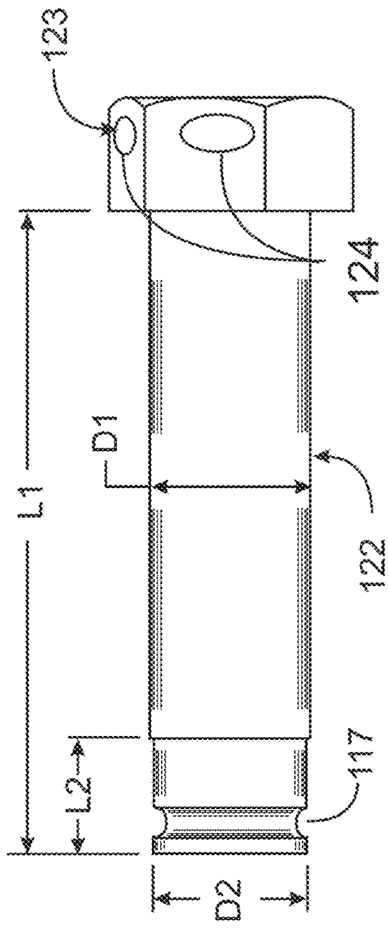
FIG. 3B is a side elevation view of an anchor pin in an embodiment shown in FIG. 1B of the invention.

Anchor pin 122 is shown in side elevation in FIG. 3B, and is identical to anchor pin 102 except for the hexagonal head.

Referring again to FIG. 2, within capture head 103 there is a plunger 113 that has a first portion on one end toward bow 101 with an outside diameter that is a slip fit with an inside diameter of a portion on body 105, and a second portion on an end away from bow 101 that is a slip fit with a bore in body 105, such that plunger 113 may slide along the direction of the axis of the locking pin within body 105. Plunger 113 is urged away from a closed end of body 105 by a strong compression spring 114. In the locked position shown anchor pin 102 is locked in position by balls 116 in groove 117 of the anchor pin, and has pushed plunger 113 against spring 114, such that in this locked position there is a considerable spring force from spring 114 on plunger 113 and hence on locked anchor pin 102.

Figure 4:
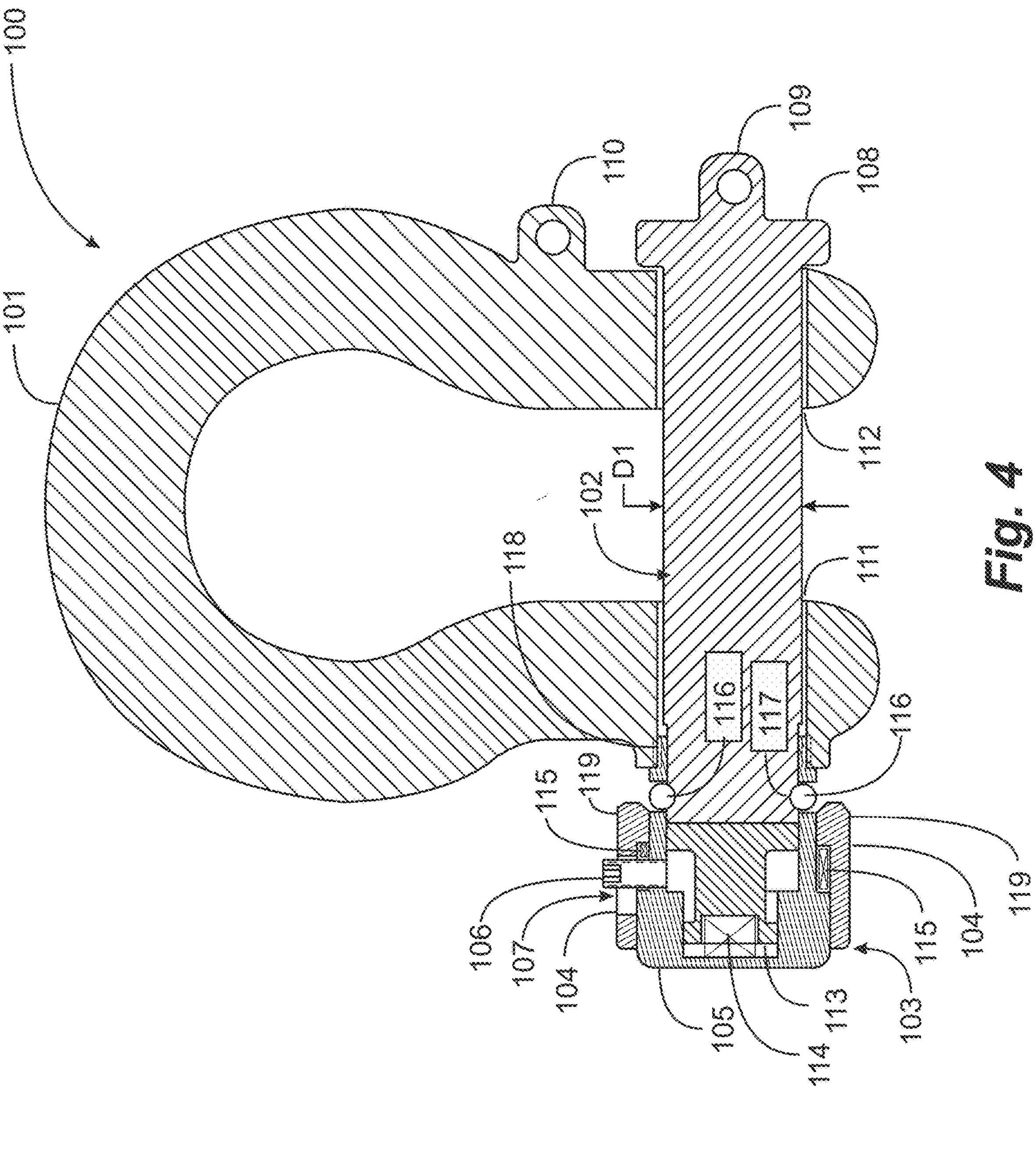
FIG. 4 is the section view of FIG. 2 with the anchor pin fully inserted in an embodiment of the invention.

FIG. 4 illustrates a circumstance wherein an operator has rotated sleeve 104 to disengage pin 106 from the locked position of the L-shaped notch 107 and has pulled sleeve 104 away from bow 101 against spring 115 to disengage the sleeve from fully constraining the balls in groove 117 of anchor pin 102. At this instant the forward portion 119 of sleeve 104 no longer constrains balls 116 fully into groove 117 of anchor pin 102. From this circumstance, as plunger 113 moves to the right, toward bow 101, an edge of groove 117 pushes balls 116 out of groove 117 releasing the anchor pin to be removed. It should be apparent to the skilled person that the operation will be the same with anchor pin 122.

Figure 5:
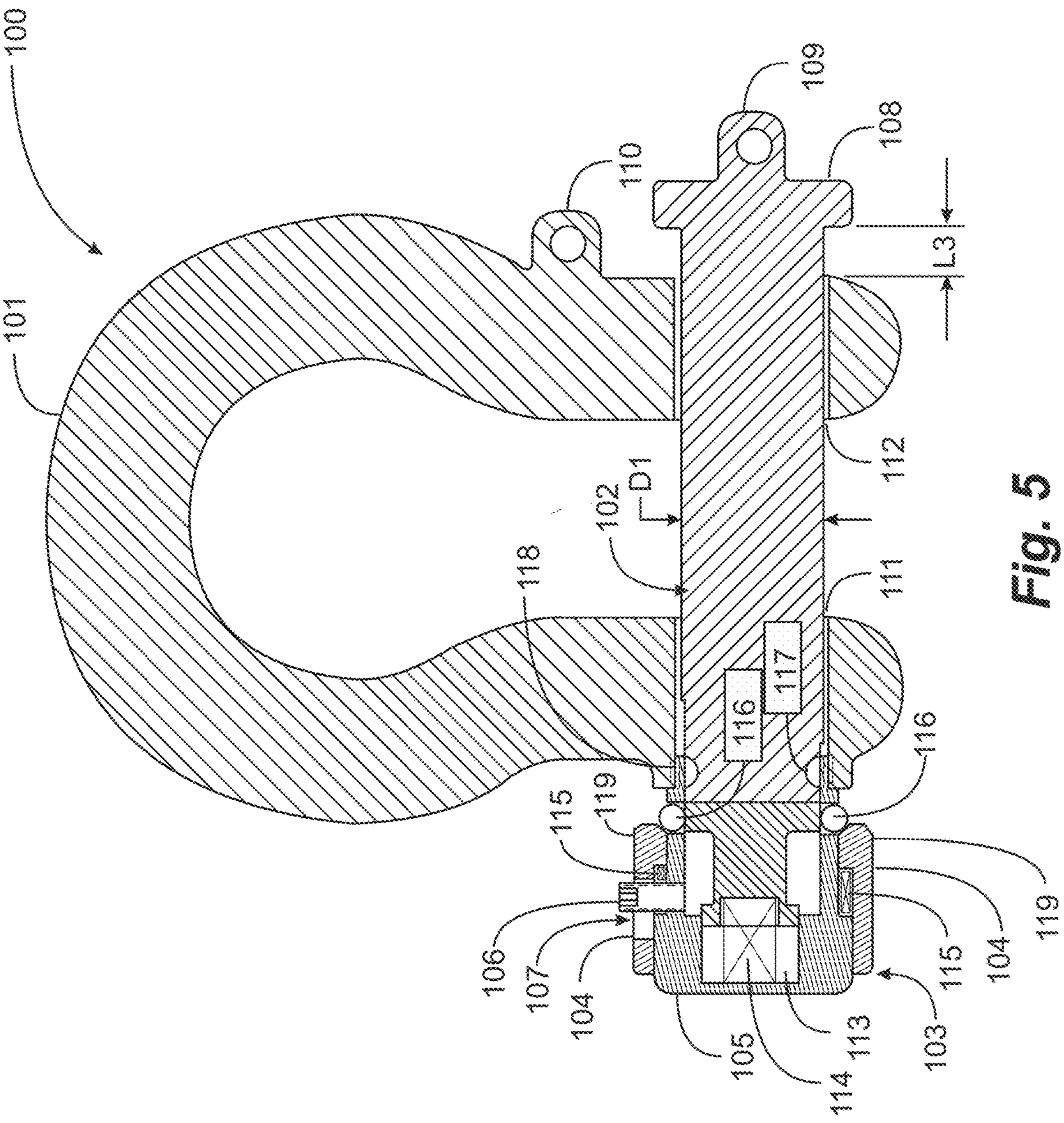
FIG. 5 is the section view with the anchor pin partially withdrawn in an embodiment of the invention.
Figure 6:
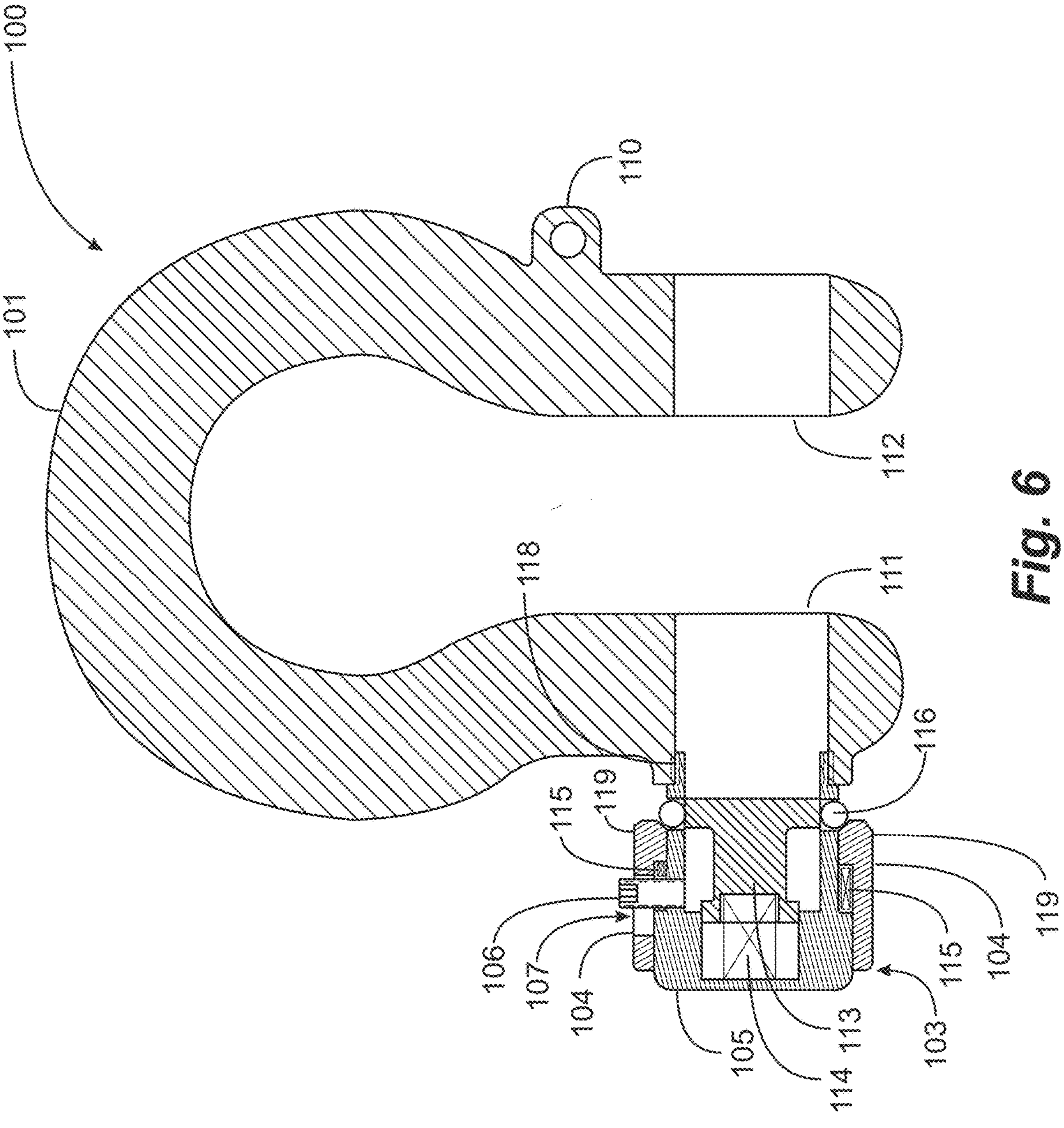
FIG. 6 is a section view with the anchor pin fully withdrawn in an embodiment of the invention.

FIG. 5 illustrates a next circumstance wherein anchor pin 102 has moved a distance L3 and one end of plunger 113 is even with the lateral position of balls 116. Balls 116 are radially outside the end diameter of the anchor pin, and in this position the balls restrain sleeve 104 from sliding forward by influence of spring 115. From this position anchor pin 102 may be completely removed from the bow through holes 111 and 112. FIG. 6 illustrates the circumstance where anchor pin is fully removed from bow 101. It should be remembered that, as illustrated in FIG. 1 the anchor pin will still be tethered to the bow by cable 120.

To replace and lock the anchor pin through holes 111 and 112 in the legs of the bow, reference may be made to the previous figures. Referring again to FIG. 5, it may be assumed that anchor pin 102 has just been placed through hole 112 and hole 111 to the position shown against plunger 113. From this circumstance, with sleeve 104 withdrawn as is illustrated in FIG. 5, pushing the anchor pin into capture head 103 pushes plunger 113 to the left depressing spring 114 and aligns groove 117 with balls 116 in body 105, as may be seen in FIG. 4. As balls 116 no longer restrain sleeve 104 against spring 115 sleeve 104 moves forward, toward bow 101, and portion 119 moves over the balls locking the balls in the groove. At this point the user rotates sleeve 104 to engage pin 106 in leg 121*b* of L-shaped notch 107, and the anchor pin is fully engaged and locked in place.

Figure 7:
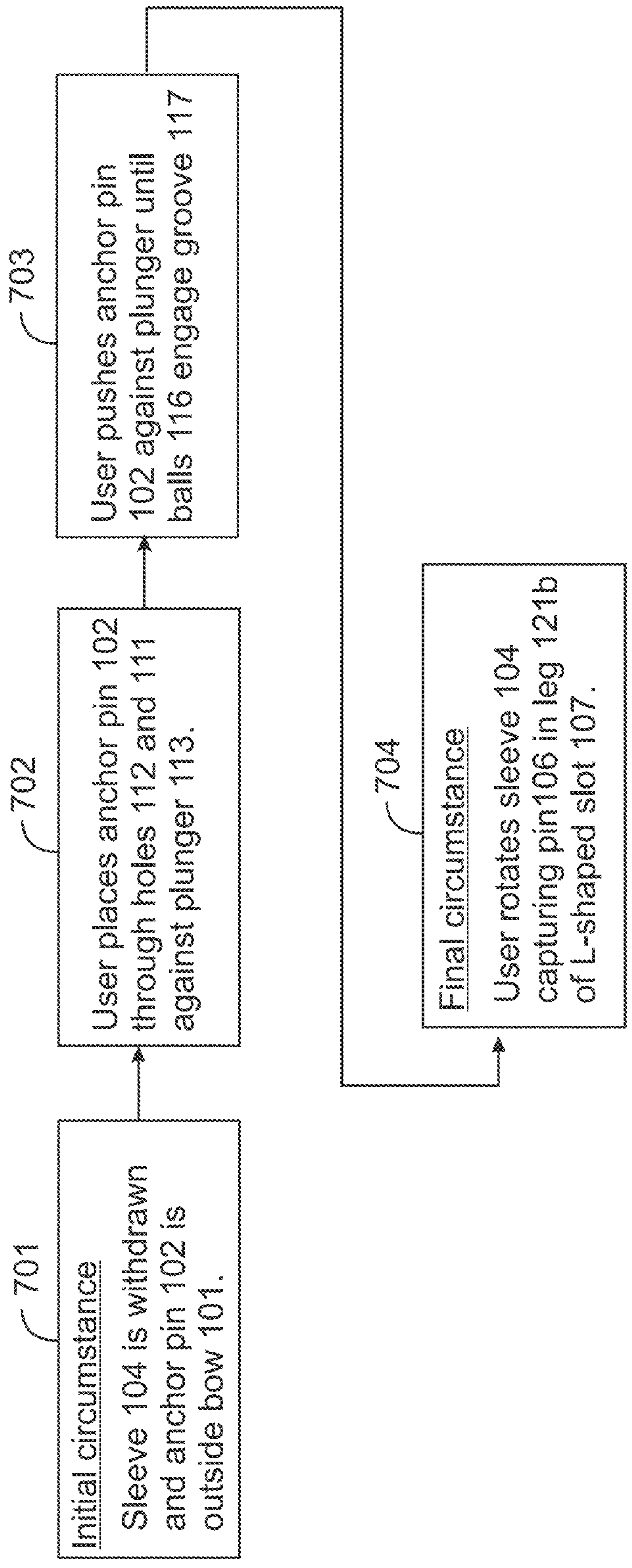
FIG. 7 is a flow diagram depicting insertion and locking of an anchor pin in an embodiment of the invention.

A process of inserting and locking anchor pin 102 through bow 101 and locking the anchor pin in capture head 103 is expressed in a flow chart illustrated in FIG. 7. Step 701 is an initial circumstance, as shown in FIG. 6, wherein anchor pin 102 is completely withdrawn from bow 101. At this initial circumstance balls 116 constrain sleeve 104 from moving toward bow 101 under influence of spring 115. At step 702 the user inserts anchor pin through holes 112 and 111 of bow 101 to contact plunger 113. This circumstance is illustrated by FIG. 5. At step 703 the user pushes the anchor pin against plunger 113 depressing spring 114. Plunger 113 moves to the left and anchor pin 102 moves to align groove 117 with balls 116, at which instant the balls enter groove 117 releasing sleeve 104 to move forward under influence of spring 115, and the sleeve assumes the position shown in FIG. 2, locking the balls in groove 117. Step 704 the user rotates sleeve 104 to capture pin 106 in leg 121*b* of L-shaped notch 107.

Figure 8:
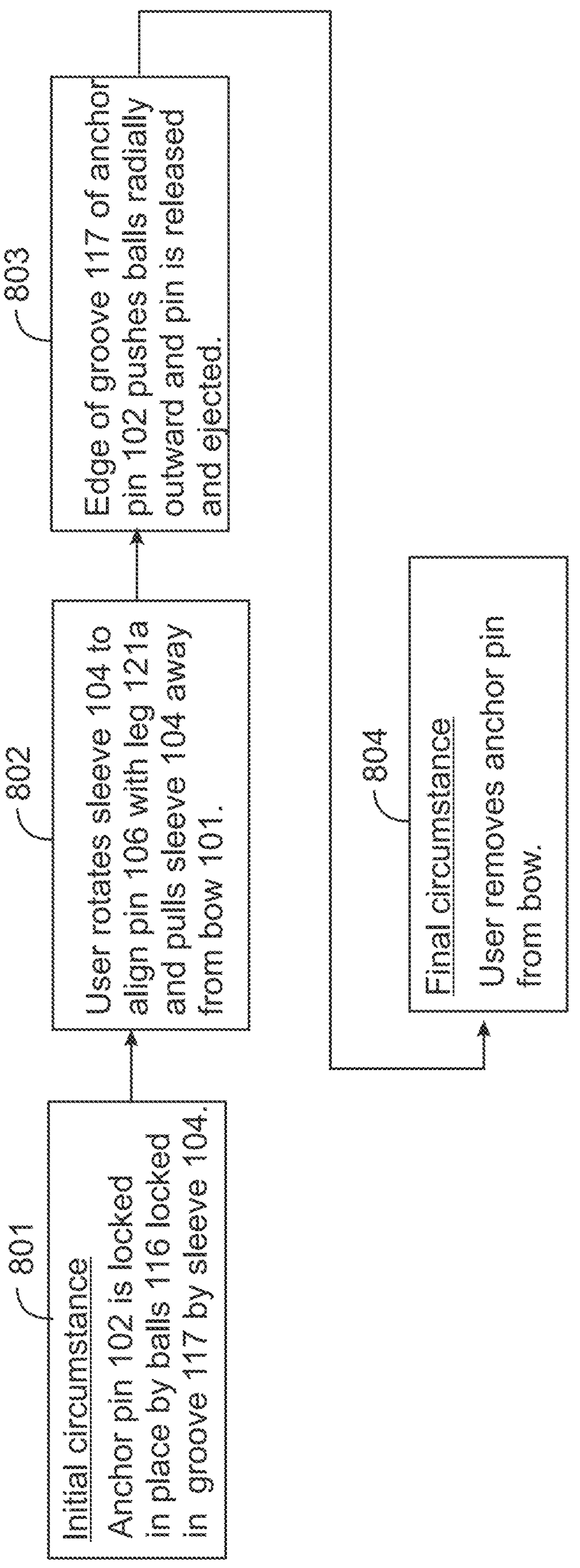
FIG. 8 is a flow diagram depicting unlocking and withdrawal of an anchor pin in an embodiment of the invention.

FIG. 8 illustrates a process of releasing the anchor pin from the capture head and removing the anchor pin from the bow. An initial circumstance is shown at step 801 wherein anchor pin 102 is locked in place by balls 116 locked in groove 117 by sleeve 104. At step 802 the user rotates sleeve 104 to align pin 106 with leg 121*a* of L-shaped notch 107 and pulls sleeve 104 away from bow 101. At step 803 an edge of groove 117 pushes balls 116 radially outward and pin 102 is released and ejected by force of spring 114. At step 804 the user removes pin 102 from the bow.

The skilled person will understand that the embodiments illustrated and described are entirely exemplary and are not limiting to the scope of the invention, which is limited only by the claims.

The invention claimed is:

1. A shackle apparatus, comprising:

a bow having first and second legs, with first and second aligned holes through the legs;

a capture head including a body with a substantially hollow cylindrical cross-section, affixed to the bow outside of the second leg, aligned with the second hole, the capture head comprising metal balls in radial channels;

an anchor pin adapted to fit through the first and second holes and into the capture head, the anchor pin having a circumferential groove proximate an end entering the capture head; and a plunger within the body having an outside diameter as a slip fit with an inside diameter of the body and a first compression spring between the closed end of the body and the plunger, biasing the plunger toward the bow;

wherein placing the anchor pin through the first and second holes and into the capture head causes the capture head to move the balls radially into the circumferential groove in the anchor pin, locking the anchor pin in the bow.

2. The shackle apparatus of claim 1 wherein, the body is closed on a first end and open with male threads on a second end and a plurality of three or more channels extending radially and equally spaced, at a point along a length of the body, the body joined rigidly to the bow with the male threads engaging female threads in the inside diameter of the second hole through the second leg.

3. The shackle apparatus of claim 2 wherein the body is rigidly joined to the bow by male threads on an end of the body toward the bow engaging female threads in one of the holes through the legs of the bow.

4. The shackle apparatus of claim 1 wherein the capture head further comprises a locking sleeve with an inside diameter engaging an outside diameter of the body and a conical shape on one end, the sleeve capturing the locking pin in an L-shaped notch having a first longitudinal leg and a second leg at a right angle to the longitudinal leg, the first longitudinal leg constraining the sleeve to translate a limited length in a direction of an axis of the body and the second leg constraining the sleeve to rotate a limited amount about the body, the sleeve urged toward the bow by a second compression spring between a first shoulder on the sleeve and a second shoulder on the body.

5. The shackle apparatus of claim 4 further comprising a first retainer loop on the bow on a side opposite the capture head, and a second retainer loop on an end of the anchor pin opposite the end inserted through the holes in the legs of the bow, with a tie between the retainer loops of a length that he anchor pin may be inserted through the holes in the legs of the bow and removed, the tie between the retainer loops ensuring that the anchor pin always stays with the bow.

6. The shackle apparatus of claim 4 wherein, with the anchor pin removed from the holes in the legs of the bow, the balls are constrained to be wholly outside the outer diameter of the anchor pin by an outside diameter of the plunger with the balls constraining the sleeve away from the bow, and wherein placing the anchor pin through the holes in the legs of the bow and against the plunger, pushing the plunger against the first compression spring, the plunger moves toward the closed end of the body, the circumferential groove in the anchor pin aligns with the balls, and the sleeve, urged by the second compression spring, moves the balls into the groove and captures the balls in the groove, locking the anchor pin in the capture head.

7. The shackle apparatus of claim 6 wherein a user rotating the sleeve holding the balls in the groove of the anchor pin locks the sleeve in a forward position with the locking pin in the second leg of the L-shaped notch keeps the anchor pin locked in the bow.

8. The shackle apparatus of claim 7 wherein with the anchor pin locked into the capture head, a user rotating the sleeve to bring the locking pin aligned with the longitudinal leg of the L-shaped notch and pulling the sleeve toward the closed end of the body enables the plunger urged by the first compression spring to move the anchor pin in a direction away from the closed end of the body, an edge of the groove in the anchor pin moving the balls radially away out of the groove with an outside diameter of the plunger moving to hold the balls outside an outside diameter of the anchor pin.

9. The shackle apparatus of claim 8 wherein the user is enabled to pull the unlocked anchor pin fully out through the holes in the legs of the bow.

10. A method for providing a shackle, comprising:

placing an anchor pin having a circumferential groove proximate one end of the anchor pin through aligned holes in legs of a bow with the end having the circumferential groove entering a capture head rigidly affixed to the bow, the capture head having three or more balls in equally spaced radial channels, the capture head also comprising a body with a substantially hollow cylindrical cross-section;

providing a plunger within the body having an outside diameter as a slip fit with an inside diameter of the body and a first compression spring between the closed end of the body and the plunger, biasing the plunger toward the bow, comprising moving the anchor pin against the plunger compressing the first compression spring; and moving the anchor pin to a position where the circumferential groove aligns with the radial channels of the capture head, at which position the balls enter the circumferential groove and the anchor pin is locked in the bow.

11. The method off claim 10 wherein, the body is closed on a first end and open with male threads on a second end and a plurality of three or more channels extending radially and equally spaced, at a point along a length of the body, the body is joined rigidly to the bow with the male threads engaging female threads in the inside diameter of the second hole through the second leg, wherein the step of moving the anchor pin translates the anchor pin in the body and aligns the groove with the channels in the body.

12. The method of claim 11 comprising rigidly joining the body to the bow by engaging male threads on an end of the body toward the bow with female threads in one of the holes through the legs of the bow.

13. The method of claim 10 wherein the capture head further comprises a locking sleeve with an inside diameter engaging an outside diameter of the body and a conical shape on one end, the sleeve capturing the locking pin in an L-shaped notch having a first longitudinal leg and a second leg at a right angle to the longitudinal leg, the first longitudinal leg constraining the sleeve to translate a limited length in a direction of an axis of the body and the second leg constraining the sleeve to rotate a limited amount about the body, the sleeve urged toward the bow by a second compression spring between a first shoulder on the sleeve and a second shoulder on the body.

14. The method of claim 13 further comprising a first retainer loop on the bow on a side opposite the capture head, and a second retainer loop on an end of the anchor pin opposite the end inserted through the holes in the legs of the bow, comprising joining a tie between the retainer loops of a length that he anchor pin may be inserted through the holes in the legs of the bow and removed, the tie between the retainer loops ensuring that the anchor pin always stays with the bow.

15. The method of claim 13 wherein, with the anchor pin removed from the holes in the legs of the bow, constraining the balls wholly outside the outer diameter of the anchor pin by an outside diameter of the plunger with the balls constraining the sleeve away from the bow, and placing the anchor pin through the holes in the legs of the bow and against the plunger, pushing the plunger against the first compression spring, the plunger moving toward the closed end of the body, the circumferential groove in the anchor pin aligning with the balls, and the sleeve, urged by the second compression spring, moving the balls into the groove and capturing the balls in the groove, locking the anchor pin in the capture head.

16. The method of claim 15 comprising a user rotating the sleeve holding the balls in the groove of the anchor pin, locking the sleeve in a forward position with the locking pin in the second leg of the L-shaped notch keeping the anchor pin locked in the bow.

17. The method of claim 16 wherein with the anchor pin locked into the capture head, rotating the sleeve to bring the locking pin aligned with the longitudinal leg of the L-shaped notch and pulling the sleeve toward the closed end of the body, enabling the plunger urged by the first compression spring to move the anchor pin in a direction away from the closed end of the body, an edge of the groove in the anchor pin moving the balls radially away out of the groove with an outside diameter of the plunger moving to hold the balls outside an outside diameter of the anchor pin.

18. The method of claim 17 comprising the user pulling the unlocked anchor pin fully out through the holes in the legs of the bow.

* * * * *